(12) United States Patent
McGill

(10) Patent No.: US 10,926,777 B2
(45) Date of Patent: Feb. 23, 2021

(54) VEHICLES AND METHODS OF CONTROLLING A VEHICLE TO ACCOMMODATE VEHICLE CUT-IN

(71) Applicant: Toyota Research Institute, Inc., Los Altos, CA (US)

(72) Inventor: Stephen G. McGill, Broomall, PA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 16/164,087

(22) Filed: Oct. 18, 2018

(65) Prior Publication Data

US 2020/0122737 A1 Apr. 23, 2020

(51) Int. Cl.
*G05D 1/00* (2006.01)
*B60W 50/00* (2006.01)

(52) U.S. Cl.
CPC ....... *B60W 50/0097* (2013.01); *G05D 1/0088* (2013.01); *B60W 2050/0057* (2013.01); *B60W 2050/0089* (2013.01); *B60W 2554/80* (2020.02); *G05D 2201/0213* (2013.01)

(58) Field of Classification Search
USPC .......................................................... 701/27
See application file for complete search history.

(56) References Cited

U.S. PATENT DOCUMENTS

| 7,444,241 | B2 | 10/2008 | Grimm |
| 8,457,827 | B1* | 6/2013 | Ferguson ............. G05D 1/0088 701/23 |
| 9,002,614 | B2 | 4/2015 | Tominaga |
| 2015/0266477 | A1* | 9/2015 | Schmudderich ...... B60W 30/09 701/98 |
| 2016/0325743 | A1* | 11/2016 | Schmudderich .. B60W 30/0956 |
| 2017/0080940 | A1 | 3/2017 | Ito |

(Continued)

FOREIGN PATENT DOCUMENTS

| JP | 2007186141 | 7/2007 |
| JP | 2010072969 | 4/2010 |
| JP | 2019-95875 | * 11/2017 |

OTHER PUBLICATIONS

US 5,636,148 A1, 10/2003, Higuchi (withdrawn)

(Continued)

*Primary Examiner* — James M McPherson
(74) *Attorney, Agent, or Firm* — Dinsmore & Shohl LLP

(57) ABSTRACT

Vehicles and methods of predicting a surrounding vehicle cut-in and controlling the vehicle to accommodate the vehicle cut-in are disclosed. In one embodiment, a vehicle includes one or more sensors operable to generate data of a surrounding vehicle, one or more processors, and a non-transitory computer-readable medium storing computer-executable instructions. When the computer-executable instructions are executed by the one or more processors, the one or more processors receive the data of the surrounding vehicle, and extract one or more features from the data of the surrounding vehicle. Based on the one or more features, the one or more processors are controlled to determine a probability that the surrounding vehicle will cut in front of the vehicle, and to control the vehicle in accordance with the probability that the surrounding vehicle will cut in front of the vehicle.

20 Claims, 6 Drawing Sheets

(56) References Cited

U.S. PATENT DOCUMENTS

2018/0183650 A1* 6/2018 Zhang .................... G01S 13/00

OTHER PUBLICATIONS

Schmuedderich, J. et. al, .A novel approach to driver behavior prediction using scene context and physical evidence.. 3rd International Symposium on Future Active Safety Technology Toward Zero Traffic Accidents: Sep. 9-11, 2015 Gothenburg, Sweden: p. 85-92. (Year: 2015).*
JP 2019-95875A, Vehicle control device, vehicle control method and program, Miura et. al, Honda Motor Co LTD, application JP 2017-222427 filed Nov. 20, 2017, English Translation of Specification from Espacenet.com, (Year: 2017).*
A novel approach to driver behavior prediction using scene context and physical evidence for intelligent Adaptive cruise Control (i-ACC), http://www.honda-ri.de/pubs/pdf/1058.pdf, Jun. 19, 2015.
Master's thesis presentation—Predicting cut-ins in traffic using a neural network, http://www.chalmers.se/en/departments/e2/calendar/Pages/Master-thesis-presentation-Predicting-cut-ins-in-traffic-using.aspx, Sep. 1, 2017.

* cited by examiner

VEHICLES AND METHODS OF CONTROLLING A VEHICLE TO ACCOMMODATE VEHICLE CUT-IN

TECHNICAL FIELD

The present specification generally relates to vehicles and methods of controlling vehicles and, more particularly vehicles and methods of controlling vehicles to predict and accommodate vehicle cut-in.

BACKGROUND

When a vehicle is traveling on a road, another vehicle (i.e., a surrounding vehicle) also traveling on the road may attempt to pass the vehicle. In some cases, the surrounding may abruptly cut in front of the vehicle by performing a cut-in maneuver. However, the driver of the vehicle may not anticipate the cut-in maneuver and may control the vehicle in an unpredictable manner. When the vehicle is autonomously driven, the autonomous controller may not be able to appropriately control the vehicle quickly enough.

SUMMARY

In one embodiment, a vehicle includes one or more sensors operable to generate data of a surrounding vehicle, one or more processors, and a non-transitory computer-readable medium storing computer-executable instructions. When the computer-executable instructions are executed by the one or more processors, the one or more processors receive the data of the surrounding vehicle, and extract one or more features from the data of the surrounding vehicle. Based on the one or more features, the one or more processors are controlled to determine a probability that the surrounding vehicle will cut in front of the vehicle, and to control the vehicle in accordance with the probability that the surrounding vehicle will cut in front of the vehicle.

In accordance with another embodiment, a method of controlling a vehicle includes generating, by one or more sensors, data of a surrounding vehicle, and extracting one or more features from the data of the surrounding vehicle. The method further includes, based on the one or more features, determining a probability that the surrounding vehicle will cut in front of the vehicle, and controlling the vehicle in accordance with the probability that the surrounding vehicle will cut in front of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to vehicles and methods of predicting a surrounding vehicle cut-in and controlling the vehicle to accommodate the vehicle cut-in.

By predicting when a surrounding vehicle will cut in front of an ego vehicle, the ego vehicle or the driver of the ego vehicle may receive advance warning of the cut-in maneuver. As used herein, the "ego vehicle" means the vehicle having the functionalities described herein and that is controlled to accommodate vehicle cut in by surrounding vehicles within the environment of the ego vehicle. The ego vehicle may also be referred to herein as "the vehicle." Advance warning, even if it is a few seconds or less than a second, may enable the ego vehicle to be controlled to accommodate the cut-in maneuver and avoid the surrounding ego vehicle. In one example, a warning may be issued to a driver of the ego vehicle of a potential surrounding vehicle cut-in. The driver may then be aware of the potential cut-in maneuver and control the ego vehicle accordingly. In another example, the ego vehicle may be an autonomous vehicle that is under computer control. The computer may predict that a surrounding vehicle is likely to cut in front of the ego vehicle. The computer may then control the ego vehicle accordingly to avoid the surrounding vehicle during the cut-in maneuver. For example, the computer may cause the ego vehicle to enter a cut-in mode where it more closely monitors the properties of the surrounding vehicle (e.g., speed, acceleration, position, and the like) and more defensively controls the ego vehicle to accommodate the surrounding vehicle (e.g., slow down to allow the surrounding vehicle to pass in front of the vehicle.

In embodiments of the present disclosure, a vehicle (i.e., ego vehicle) includes sensors that collect data corresponding to attributes of surrounding vehicles, such as speed, acceleration, position, and the like. Features of the data of one or more attributes of individual surrounding vehicles are extracted. Features of individual surrounding vehicles are compared to historical features to determine a probability of vehicle cut-in. For example, a particular feature may be more likely to indicate a vehicle cut-in than a different feature as described in more detail. Thus, data and features of many surrounding vehicles, as well as whether or not a cut-in maneuver occurred, are recorded over time to continuously build a prediction model that is used to predict whether a surrounding vehicle will cut in front of a current vehicle in real-time.

Various embodiments of vehicles and methods of predicting vehicle cut-in are described in detail below.

Figure 1:
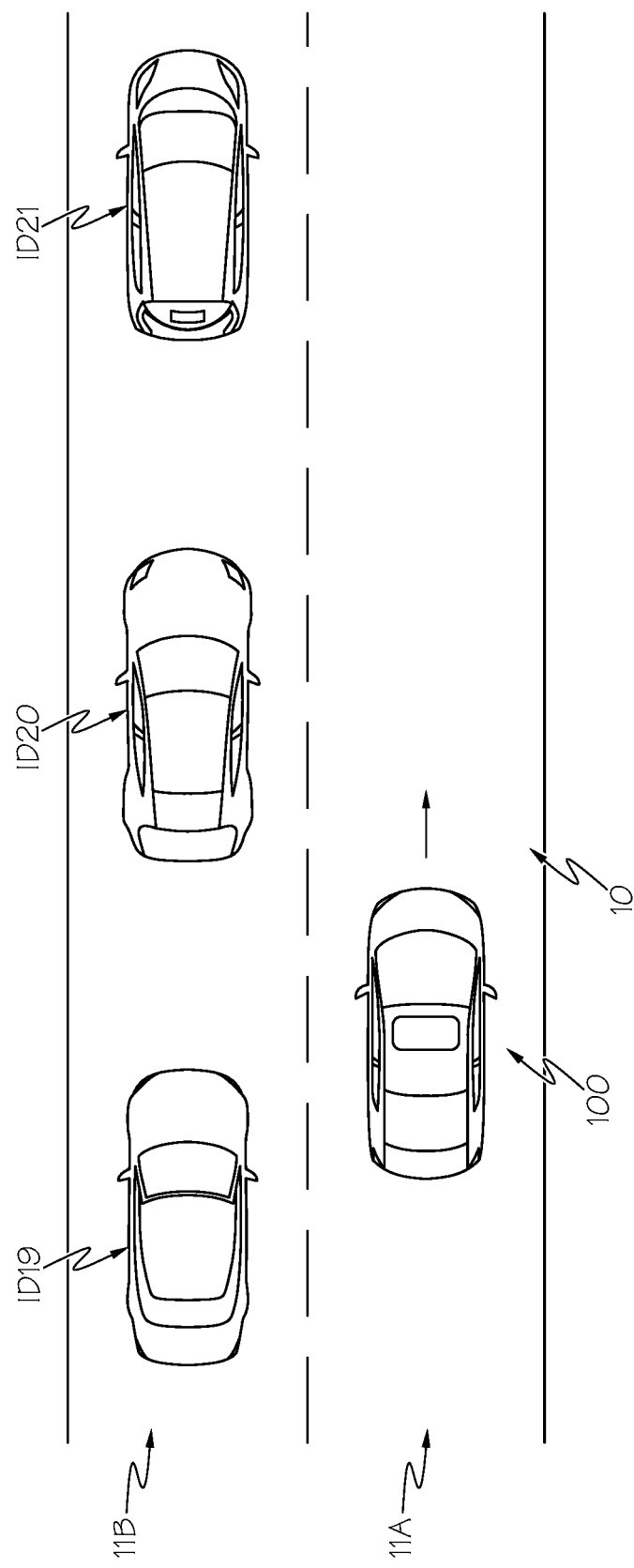
FIG. 1 schematically depicts an example scenario of an ego vehicle and a plurality of surrounding vehicles on a roadway.

Referring now to FIG. 1, a non-limiting roadway 10, an ego vehicle 100, and a plurality of surrounding vehicles (ID19, ID20, ID21) are schematically illustrated. The ego vehicle 100 is programmed or otherwise configured to perform the cut-in prediction functionalities as described herein.

As shown in FIG. 1, the ego vehicle 100 is traveling in the right lane 11A in a direction indicated by the arrow. There are three surrounding vehicles, ID19, ID20, and ID21, traveling in the left lane 11B in the same direction as the ego vehicle 100. It is possible that any one of the three surrounding vehicles ID19, ID20, and ID21 may attempt to cut in front of the ego vehicle 100. For example, surrounding vehicle ID21 may move from the left lane 11B into the right lane 11A to avoid surrounding vehicle ID20 being too close behind it. As another example, surrounding vehicle ID20 may attempt to pass surrounding vehicle ID21 by cutting in front of the ego vehicle 100. As yet another example, surrounding vehicle ID19 may desire to pass both surrounding vehicle ID20 and ID21 by cutting in front of the ego vehicle 100 and entering the right lane 11A at a high speed. It is also possible that none of the surrounding vehicles will attempt to cut in front of the ego vehicle 100.

The vehicles described herein (e.g., the ego vehicle 100 of FIG. 1) are configured to monitor the movements of surrounding vehicles and predict whether a cut-in maneuver will be performed. Vehicles described herein include one or more sensors capable of gathering data with respect to movements of the surrounding vehicles (see FIG. 10). Embodiments are not limited to the type of sensors provided on the ego vehicle 100. Non-limiting sensors include lidar sensors, radar sensors, proximity sensors, image sensors, and time-of-flight sensors. Any current or yet-to-be-developed sensor capable of detecting the presence, location, and/or movement of surrounding vehicles may be utilized.

In FIG. 1, the sensors of the ego vehicle 100 detect attributes of the surrounding vehicles ID19, ID20, and ID21, such as location, trajectory, speed, and acceleration. The data generated by the sensors may be stored in one or more non-transitory computer-readable mediums either on-board the vehicle or in a remote server. For example, the data may be wirelessly transferred from the ego vehicle 100 to one or more remote servers for remote processing.

Processors of the ego vehicle 100 (and/or one or more remote servers) receive the data from the one or more sensors and create one or more profiles. The profiles include data over periods of time. As non-limiting examples, a speed profile includes the speed of a surrounding vehicle over a predetermined period of time, an acceleration profile includes the acceleration of a surrounding vehicle over a predetermined period of time, and a lateral position profile that includes the lateral movement (i.e., the movement of a vehicle in a position orthogonal to the direction of travel) indicative of swerving. Embodiments are not limited by the duration of the predetermined period of time. Non-limiting examples of a predetermined period of time include 60 seconds, 30 seconds, 10 seconds, 1 second, 750 milliseconds, 500 milliseconds, 250 milliseconds, 100 milliseconds, and 50 milliseconds. Multiple profiles may be created by overlapping predetermined periods of time.

As described in more detail below, one or more features are extracted from the one or more profiles to make a prediction as to whether or not a cut-in maneuver will occur.

Figure 2A:
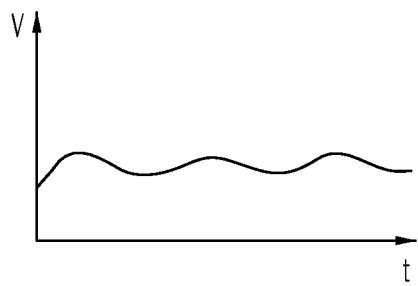
FIG. 2A graphically depicts an example speed profile of a surrounding vehicle according to one or more embodiments described and illustrated herein.
Figure 2B:
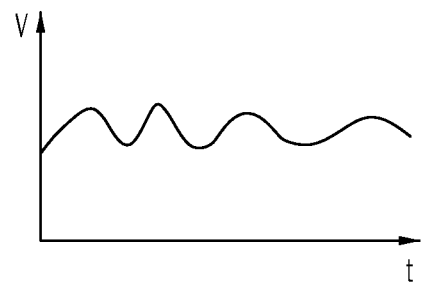
FIG. 2B graphically depicts another example speed profile of a surrounding vehicle according to one or more embodiments described and illustrated herein.
Figure 2C:
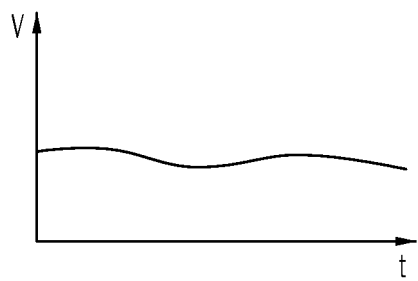
FIG. 2C graphically depicts another example speed profile of a surrounding vehicle according to one or more embodiments described and illustrated herein.

Referring now to FIGS. 2A-2C, three non-limiting speed profiles are graphically illustrated. Each speed profile plots velocity v (i.e., speed) over time. In FIG. 2A, the speed of the surrounding vehicle moderately oscillates over time. However, in FIG. 2B, the speed of the surrounding vehicle oscillates more significantly over time than as shown in FIG. 2A. Finally, the speed of the surrounding vehicle represented by the speed profile of FIG. 2C varies only little as compared to the speed profiles shown in FIGS. 2A and 2B.

After determining the speed profile, one or more features of the speed profile are extracted. Any feature may be extracted from the speed profile. The feature that is extracted is then compared to features of historic speed profiles to make a cut-in prediction. As a non-limiting example, the feature may be extracted by performing a Fourier transform of the signal of the speed profile. By transforming the speed profile into the frequency domain, a histogram (i.e., a distribution) of the speed profile may be created. As described in more detail below, the histogram may be compared with prior histograms to determine the probability of a cut-in maneuver.

Figure 3:
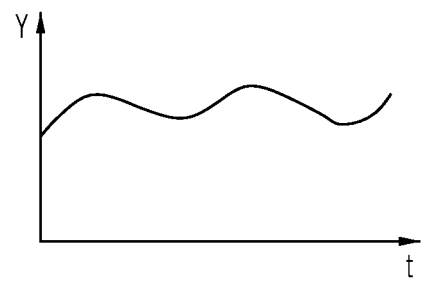
FIG. 3 graphically depicts an example lateral movement profile of a surrounding vehicle according to one or more embodiments described and illustrated herein.

FIG. 3 shows an example lateral movement profile of a surrounding vehicle. The lateral movement is in the y-direction, which is orthogonal to the x-direction (i.e., the direction of travel of the surrounding vehicle). The surrounding vehicle represented by the lateral movement profile of FIG. 3 is swerving back and forth over a period of time of the profile.

Figure 4A:
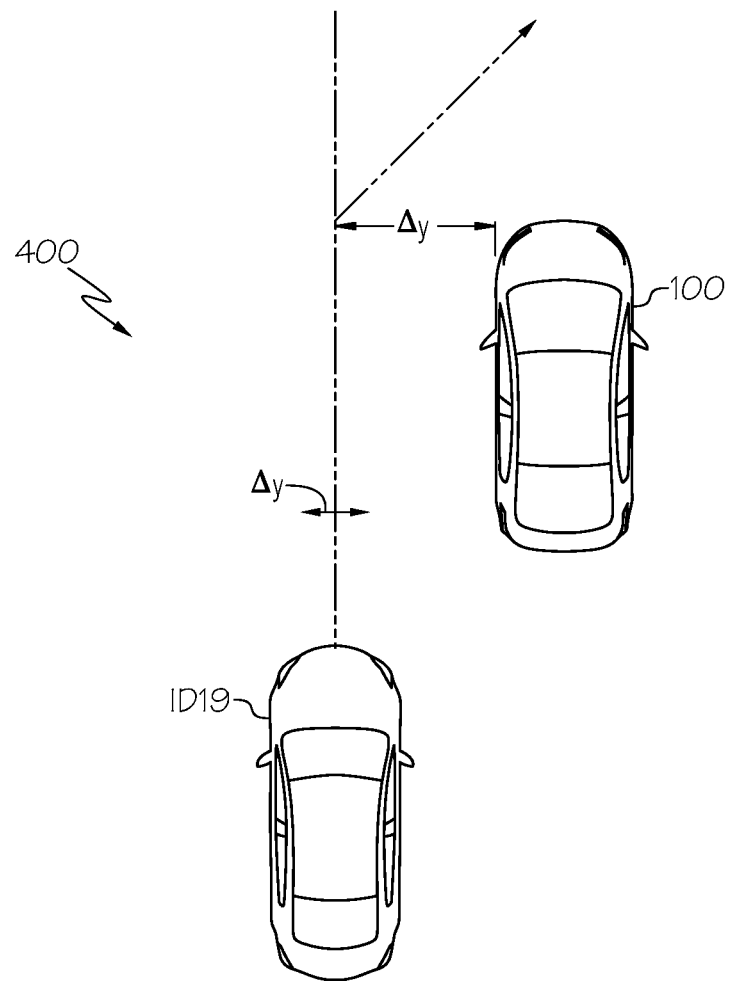
FIG. 4A schematically depicts a trajectory of a surrounding vehicle performing a cut-in maneuver in front of an ego vehicle.

FIG. 4A schematically depicts an example cut-in maneuver wherein a surrounding vehicle ID19 has a trajectory 400 that takes it from the left lane and into the right lane in front of the ego vehicle 100. The surrounding vehicle ID19 has a very small lateral movement ($\Delta y$) when it is behind or next to the ego vehicle (e.g., ±1 cm lateral movement). However, there is much larger lateral movement when the surrounding vehicle ID19 is in beyond the ego vehicle 100 (e.g., +1 m lateral movement).

As stated above, one or more lateral movement profiles may be determined for one or more surrounding vehicles. Like the speed profile, one or more features are extracted from the one or more lateral movement profiles. Embodiments are not limited by the method of feature extraction. As a non-limiting example, the feature is extracted by applying a Fourier transform to the one or more lateral movement profiles to create one or more histograms or distributions (i.e., vehicle distributions). These one or more histograms or distributions may be compared to prior histograms or distributions to determine a probability of a cut-in maneuver occurring.

Figure 4B:
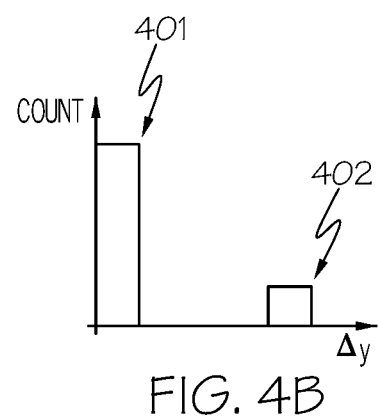
FIG. 4B graphically depicts a histogram of lateral movement of the surrounding vehicle depicted by FIG. 4A according to one or more embodiments described and illustrated herein.

FIG. 4B is an example histogram of the cut-in maneuver shown by FIG. 4A. The vertical axis is a count number and the horizontal axis is a range of lateral movement $\Delta y$. A majority of the movement of the ego vehicle ID19 is in the smallest range of lateral movement (bin 401). However, a portion of the movement of the surrounding vehicle ID19 has a large lateral movement when it enters the right lane in front of the ego vehicle 100 (bin 402).

Figure 5A:
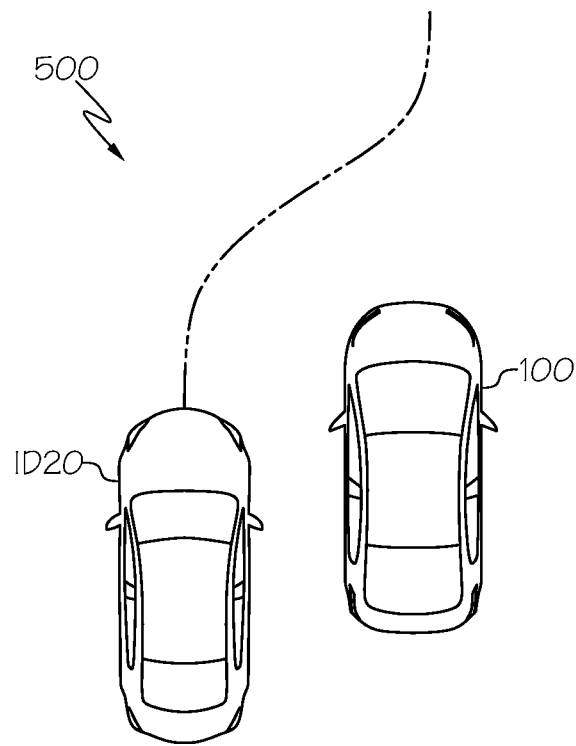
FIG. 5A graphically depicts another trajectory of a surrounding vehicle performing a cut-in maneuver in front of an ego vehicle.
Figure 5B:
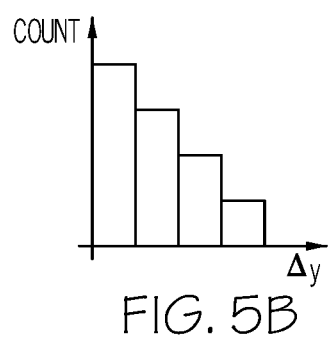
FIG. 5B graphically depicts a histogram of lateral movement of the surrounding vehicle depicted by FIG. 5A according to one or more embodiments described and illustrated herein.

FIG. 5A illustrates another trajectory 500 of a passing or cut-in maneuver of a surrounding vehicle ID20. The trajectory 500 is a gradual shift from the left lane to the right lane in front of the ego vehicle 100. A lateral movement profile (not shown) of surrounding vehicle ID20 from the data provided by the sensor(s) of the ego vehicle 100 may be generated. A Fourier transform may be applied to the lateral movement profile to generate a histogram, as shown in FIG. 5B. Compared to the histogram of FIG. 4B, the histogram of FIG. 5B shows data in each of the bins, which is indicative of a slower or more gradual transition from the left lane to the right line.

As stated above, other profiles may be created, such as an acceleration profile, a vehicle classification profile, and a vehicle spacing profile. An acceleration profile and associated extracted features may be generated as described above with respect to the vehicle speed and lateral movement.

A vehicle classification profile of a surrounding vehicle may be generated by using one or more image sensors to detect one or more vehicle features of a surrounding vehicle. The one or more vehicle features may include, but are not limited to, a vehicle type (e.g., sedan, hatchback, crossover, sport utility vehicle, pickup truck, sports car, semi-truck, and the like), a vehicle make, a vehicle year, a vehicle color, and a vehicle condition (e.g., damaged, non-damaged, clean, and dirty). The ego vehicle may extract one or more of these vehicle features of surrounding vehicles. For example, one or more object detection algorithms may be used to classify the surrounding vehicles according to the one or more vehicle features. Any known or yet-to-be-developed object recognition algorithms may be utilized to detect surrounding vehicles within the image data. Example object recognition algorithms include, but are not limited to, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like.

The extracted vehicle classification features may then be used in the probability of vehicle cut-in calculation. Historical data regarding how often a vehicle having particular vehicle features cuts in front of another vehicle may be generated. For example, every time an ego vehicle detects a cut-in maneuver by a surrounding vehicle, image data of the surrounding vehicle may be recorded and sent to one or more remote servers for analysis (or the ego vehicle may extract the one or more vehicle features on-board and then send the one or more extracted features to the one or more remote servers). Thus, data from many instances of a vehicle cut it may be collected and compiled. Statistical analysis may be performed to determine how often and how likely it is that a vehicle having a particular vehicle feature, or a set of vehicle features, is to perform a cut-in maneuver. The statistical analysis method used to determine likelihood of vehicle cut-in is not limited by this disclosure.

The one or more extracted vehicle classification features of the surrounding vehicle may then be compared with the historical data to determine a probability that the surrounding vehicle will perform a cut-in maneuver. As a non-limiting example, a red, late-model sports car may be twice as likely as a white, older sedan to perform a cut-in maneuver. This information may then be used in the cut-in probability calculation.

A vehicle spacing profile may also be obtained and used to determine the probability of a vehicle cut-in maneuver. The arrangement of surrounding vehicles with respect to the ego vehicle may be indicative of the likelihood of a vehicle cut-in maneuver. The one or more sensors of the vehicle may extract or otherwise determine the number of surrounding vehicles, the location of the surrounding vehicles, the distance between adjacent surrounding vehicles (e.g., front bumper to rear bumper distance, rear bumper to front bumper distance, and lateral distance), and the distance between the surrounding vehicles and the ego vehicle.

Historical data of the arrangement and spacing of surrounding vehicles may be recorded when a cut-in maneuver is detected by the ego vehicle. This data may then be sent to one or more remote servers for collection. Machine learning or statistical analysis may be employed to determine particular arrangements and spacings of surrounding vehicles, and particular arrangements and spacings of surrounding vehicles that are more likely to result in a vehicle cut-in maneuver than others. As a non-limiting example, the historical data may indicate that there is a 60% probability of a cut-in maneuver when an ego vehicle is in the right lane with two surrounding vehicles in the left lane, wherein the a rear surrounding vehicle is closely following (i.e., tailgating) a front surrounding vehicle. It may be likely that the rear surrounding vehicle may cut in front of the ego vehicle when both the front and rear surrounding vehicles pass the ego vehicle.

Thus, arrangement and spacing vehicles may be extracted from sensor data and used to determine a probability of vehicle cut-in.

As stated above, a data store of previously extracted features of surrounding vehicles and whether or not a cut-in occurred is created. Over time, more and more data is added to the data store. For example, an ego vehicle may extract one or more features of one or more profiles of a surrounding vehicle, and record whether or not the surrounding vehicle cut-in front of the ego vehicle. This data may be transmitted to one or more remote servers for data collection. Features and/or profiles that are indicative of a cut-in maneuver are noted and collected. Thus, a database of features and/or profiles that likely indicate a cut-in maneuver is created.

The features and/or profiles extracted by the ego vehicle in real-time are compared with historical features and/or profiles. A probability of a cut-in maneuver is calculated based at least in part on a similarity between the current feature and/or profile to a feature and/or profile associated with a cut-in maneuver. When the current feature and/or profile is very similar to a feature and/or profile associated with the cut-in maneuver, then the vehicle may determine that a cut-in maneuver is probable. Conversely, when the current feature and/or profile is not similar to a feature and/or profile associated with a cut-in maneuver, then the vehicle may determine that a cut-in maneuver is not probable.

The comparison between the current feature and/or profile of a surrounding vehicle to one or more historical features and/or profiles stored in the database maybe be performed in any manner. As a non-limiting example regarding the speed and lateral movement profiles described above and when the feature is a histogram or a distribution, a Kullback-Leibler divergence may be determined between the current feature and one or more histograms or distributions associated with a cut-in maneuver. When the Kullback-Leibler divergence shows a similarity, the vehicle may determine that a cut-in maneuver is likely.

Figure 6:
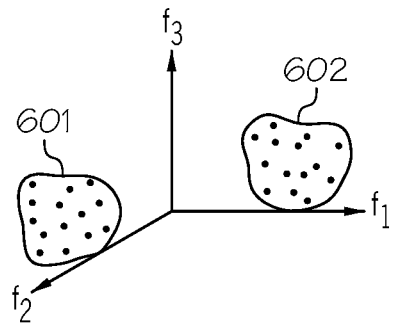
FIG. 6 depicts a three dimensional plot of three features extracted from data regarding surrounding vehicles according to one or more embodiments described and illustrated herein.

Multiple features may be extracted from multiple profiles to make the cut-in prediction. FIG. 6 shows an example where three features $f_1$, $f_2$, and $f_3$ are determined and plotted in three dimensional space. The three features are extracted for surrounding vehicles, and it is noted whether or not a cut-in occurs. As a non-limiting example, incidences clustered in a first cluster 601 may represent a car that is fast and jerky and having a chance of a cut-in maneuver of 70%, while incidences clustered in a second cluster 602 may represent a car that is slow and steady having a chance of a cut-in maneuver of 20%. It should be understood that FIG. 6 is merely an example. Thus, multiple features may be used to determine the likelihood of a cut-in maneuver. A surrounding vehicle having multiple features that have shown to produce a cut-in maneuver may cause the ego vehicle to either issue a warning to the driver or to autonomously control the ego vehicle to avoid the surrounding vehicle.

In some embodiments, the probability of a cut-in is based one more than one surrounding vehicle. As an example referring to FIG. 1, the probability of a cut-in is based on features extracted and the probability determined for each surrounding vehicle ID19, ID20, and ID21.

Additionally, in some embodiments, not only are the surrounding vehicles evaluated for determining whether a cut-in will occur, but also the movements of the ego vehicle 100 itself. It may be that the ego vehicle 100 is more likely to experience a cut-in maneuver when it is driven in a first manner as compared to when it is driven in a second manner. For example, the ego vehicle may be 20% more likely to experience a cut-in maneuver when it operates at a certain speed below the speed limit as compared to when it operates at the speed limit. In embodiments, a plurality of driving profiles is created for the ego vehicle. One or more sensors of the ego vehicle produce data regarding attributes of the ego vehicle, such as speed, acceleration, position and location in the lane as non-limiting examples. Other information may be recorded, such as time of day, time of year, weather conditions, and type of road. Cut-in maneuvers are also recorded and associated with the gathered data. Thus, conditions of the vehicle and the environment may be associated with a cut-in maneuver. A probability of a cut-in maneuver may be determined based on the driving style of the ego vehicle as well as other data, such as weather, time of day, location (i.e., metro area, a county road, a region of the country (e.g., New York City area, Silicon Valley area, the Midwest, etc.) and the like) and the like as stated above. The probability of a cut-in based on the ego vehicle may be combined with the probability based on surrounding vehicles as described above.

Figure 7:
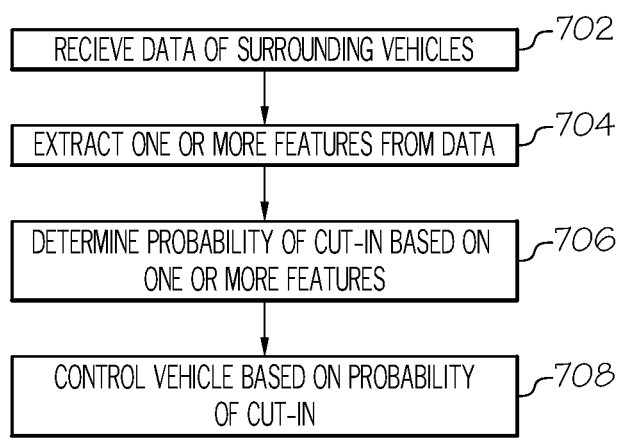
FIG. 7 graphically depicts a flowchart of an example process for determining the probability of a vehicle cut-in according to one or more embodiments described and illustrated herein.

Referring now to FIG. 7, a flowchart of an example method of controlling a vehicle by determining a probability of vehicle cut-in is graphically illustrated. At block 702, one or more processors of the vehicle (or a remote server) receive data from the one or more sensors of the ego vehicle regarding one or more surrounding vehicles. The one or more sensors may be a lidar sensor, radar, a proximity sensor, an image sensor or the like. One or more profiles (e.g., speed profile, lateral movement profile, and an acceleration profile) may be created from the data.

At block 704, one or more features are extracted from the data. The features may be extracted using any known or yet-to-be-developed method. An example method of extracting features is the application of a Fourier transform on the data. At block 706, a probability that one or more surrounding vehicles will cut in front of the vehicle is determined based on the extracted features. For example, the one or more extracted features are compared with historical features stored in a data store. When an extracted feature is similar to a historical feature correlated to a cut-in maneuver (e.g., it meets some threshold), the probability that a cut-in will occur is high. However, when the extracted feature is not similar to a historical feature correlated to a cut-in maneuver, the probability that a cut-in will occur is low.

At block 708, the vehicle is controlled in accordance with the probability of vehicle cut-in. When there is no probability of vehicle cut-in, or the probability is below a certain threshold, no action is taken by the vehicle in response to a cut-in. However, when the probability of a vehicle cut-in is greater than a certain threshold, vehicle action is taken to accommodate a cut-in. When the vehicle is driven by a driver, the vehicle action may be issuing a warning to the driver that there is a risk of vehicle cut-in. The warning may be an auditory message (e.g., either a verbal warning or an auditory sound), or a visual warning (e.g., flashing lights or a textual or symbolic message on a display). The vehicle action may also comprise taking control of the vehicle by the vehicle computer. For example, the computer of the vehicle may automatically slow the vehicle down to accommodate the potential cut-in maneuver. When the vehicle is autonomously driven, the vehicle action may be autonomously controlling the vehicle in any manner to accommodate the surrounding vehicle. For example, the vehicle computer may slow the vehicle down to let the surrounding vehicle cut-in.

Figure 8:
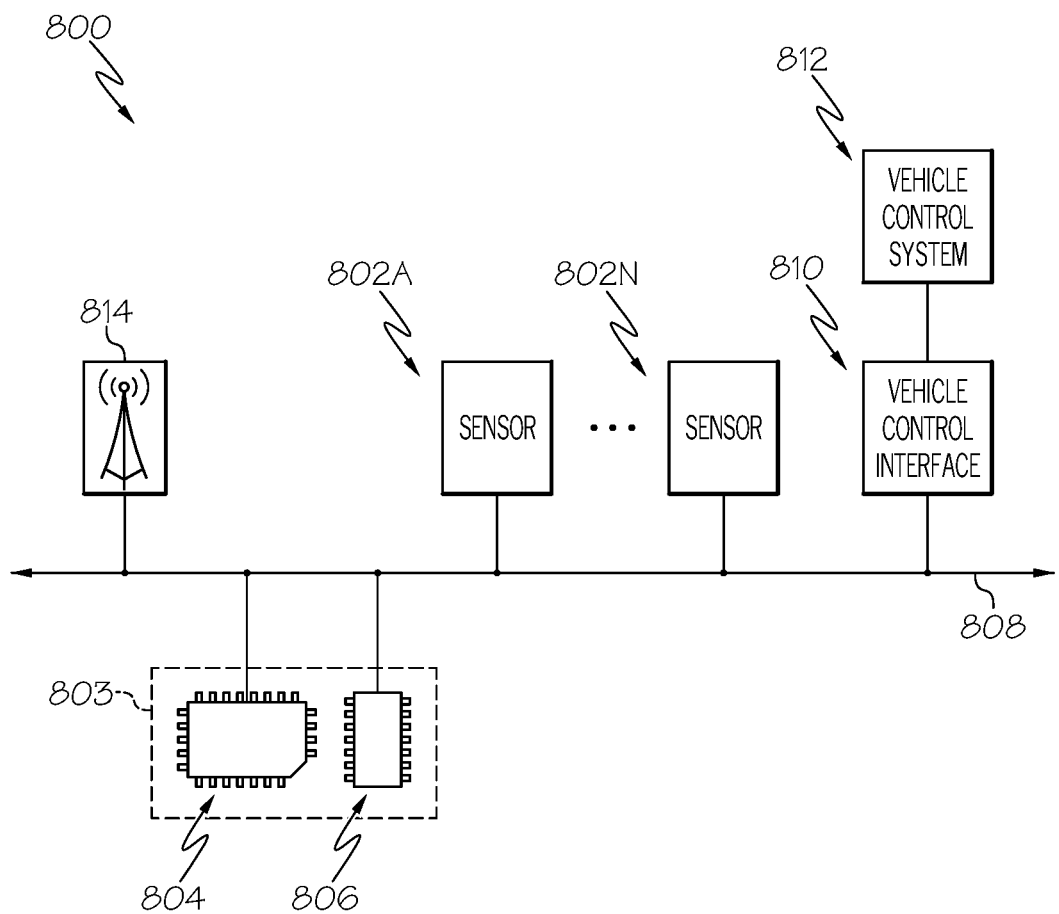
FIG. 8 schematically depicts an example vehicle capable of determining the probability of a vehicle cut-in according to one or more embodiments described and illustrated herein.

FIG. 8 schematically illustrates an example vehicle 800 capable of performing the functionalities described herein. It should be understood that FIG. 8 is merely for illustrative purposes, and that only components of the vehicle for performing the functionalities described herein are illustrated.

The vehicle 800 generally includes a vehicle computer 803, a communication path 808, one or more sensors 802A-802N capable of producing data of surrounding vehicles, network interface hardware 814, a vehicle control interface 810, and a vehicle control system 812. The vehicle 800 may be communicatively coupled to a network and one or more remote servers by way of the network interface hardware 814. The components of the vehicle 800 may be physically coupled or may be communicatively and operably coupled through the communication path 808 and/or the network.

The communication path 808 is formed from any medium that is capable of transmitting a signal such as, for example, conductive wires, conductive traces, optical waveguides, or the like. The communication path 808 may also refer to the expanse in which electromagnetic radiation and their corresponding electromagnetic waves traverses. Moreover, the communication path 808 may be formed from a combination of mediums capable of transmitting signals. In one embodiment, the communication path 808 comprises a combination of conductive traces, conductive wires, connectors, and buses that cooperate to permit the transmission of electrical data signals to and from the various components of the vehicle 800. Accordingly, the communication path 808 may comprise a bus. Additionally, it is noted that the term "signal" means a waveform (e.g., electrical, optical, magnetic, mechanical or electromagnetic) capable of traveling through a medium such as DC, AC, sinusoidal-wave, triangular-wave, square-wave, vibration, and the like.

The one or more sensors 802A-802N are any sensors capable of generating data regarding attributes of the surrounding vehicles as described above. Attributes include, but are not limited to, speed, acceleration, movement and position of the surrounding vehicle. The one or more sensors 802A-808N may also generate data regarding attributes of the vehicle itself (i.e., the ego vehicle). Non-limiting example sensors include lidar, radar, proximity sensors, and image sensors. Any other known or yet-to-be-developed sensors may be used. Any number of sensors may be used.

Data from the one or more sensors 802A-802N is provided to the vehicle computer 803 for processing. In some embodiments, the data may be provided to one or more remote servers using the network interface hardware 814.

The vehicle computer 803 includes one or more processors 804 and one or more non-transitory computer-readable mediums 806. The processor 804 may be any device capable of executing a computer-readable instruction set stored in the non-transitory computer-readable medium 806. The machine readable instruction set is operable to control the one or more processors 804 to execute the cut-in functionalities described herein. As described in more detail above, the computer-readable instruction set, when executed by the one or more processors, causes the one or more processors to extract one or more features of the data regarding one or more surrounding vehicles, determine a probability of a cut-in based on the extracted one or more features, and control the vehicle in accordance with the determined probability.

The processor 804 may be an electronic controller, an integrated circuit, a microchip, a computer, and the like. The processor 804 is communicatively coupled to the other components of the vehicle 800 by the communication path 808. Accordingly, the communication path 808 allows the components coupled to the communication path 808 to operate in a distributed computing environment. Specifically, each of the components of the vehicle 800 may operate as a node that may send and/or receive data.

The non-transitory computer-readable medium 806 of the vehicle 800 is coupled to the communication path 808 and communicatively coupled to the processor 804. The non-transitory computer-readable medium 806 may comprise RAM, ROM, flash memories, hard drives, or any non-transitory memory device capable of storing the machine-readable instruction set such that the machine-readable instruction set can be accessed and executed by the processor 804. The machine-readable instruction set may comprise logic or algorithm(s) written in any programming language of any generation (e.g., 1GL, 2GL, 3GL, 4GL, or 5GL) such as, for example, machine language that may be directly executed by the processor 804, or assembly language, object-oriented programming (OOP), scripting languages, microcode, etc., that may be compiled or assembled into machine readable instructions and stored in the non-transitory computer-readable medium 806. Alternatively, the machine-readable instruction set may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 8 includes a single non-transitory computer-readable medium 806, other embodiments may include more than one.

Still referring to FIG. 8, the network interface hardware 814 may include and/or be configured for communicating with any wired or wireless networking hardware, including an antenna, a modem, a LAN port, wireless fidelity (Wi-Fi) card, WiMax card, ZigBee card, Bluetooth chip, USB card, mobile communications hardware, and/or other hardware for communicating with other networks and/or devices. The network may be a wide area network (wired or wireless), such as a cloud network, the internet, a cellular network, or other communications network for communicating devices across a wide area. Additionally or alternatively, the network may be a wired or wireless local area network for communicating the data, such as via a local area network, near field communication (NFC), Bluetooth, wireless fidelity (Wi-Fi).

The vehicle control interface 810 provides an interface between the components of the vehicle 800 to a vehicle control system 812. The vehicle control interface 810 is configured to receive instructions from the vehicle computer 803 and provide signals to the vehicle control system 812. It should be understood that, in some embodiments, the vehicle control interface 810 is provided within the vehicle computer 803 and is not a separate device or module. The vehicle control interface 810 may provide digital and/or analog signals to the vehicle control system 812 for operational functionalities of the vehicle 800, such as motor control, breaking, steering and the like. The vehicle control system 812 is generally operable to control vehicle functions. In the context of the cut-in functionalities described herein, the vehicle control interface 810 and the vehicle control system 812 may control the vehicle 800 in accordance with the probability of a cut-in, and whether or not the vehicle 800 is being driven by the driver or autonomously driven. For example, the vehicle control system 812 includes the motor, break system, steering system, and audio system of the vehicle. When there is a probability of a vehicle cut-in and a driver is driving the vehicle, the vehicle control system 812 may produce an auditory warning using the audio system, for example. In another example, the vehicle control system 812 may control the breaking system to slow the vehicle 800 down. When the vehicle 800 is autonomously driven, the vehicle control system 812 may control the breaking system to slow the vehicle down 800, for example.

It should now be understood that embodiments of the present disclosure are directed to vehicles and methods of accommodating vehicle cut-in by determining a probability of whether or not a surrounding vehicle will cut-in front of the vehicle. Sensors on the vehicle (i.e., the ego vehicle) generate data of surrounding vehicles, such as speed, acceleration, lateral movement, and the like. One or more features are extracted from the data. The one or more extracted features are compared with historical data, such as historical features, to determine the probability of a surrounding vehicle cutting in front of the vehicle. Additionally, sensors of the vehicle may be used to classify the vehicle in addition to surrounding vehicles such that the probability of cut-in is also based on the vehicle. By determining whether or not a surrounding vehicle will cut in, the vehicle may be controlled earlier in time to avoid contact with the surrounding vehicle as it performs a cut-in maneuver.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

The invention claimed is:

1. A vehicle comprising:
   one or more sensors operable to generate data of a surrounding vehicle;
   one or more processors; and
   a non-transitory computer-readable medium storing computer-executable instructions that, when executed by the one or more processors, cause the one or more processors to:
      receive the data of the surrounding vehicle;
      extract one or more features from the data of the surrounding vehicle;
      generate a vehicle classification profile of the surrounding vehicle;
      based on the one or more features of the vehicle classification profile, determine a probability that the surrounding vehicle will cut in front of the vehicle; and
      control the vehicle in accordance with the probability that the surrounding vehicle will cut in front of the vehicle,
      wherein the probability that the surrounding vehicle will cut in front of the vehicle is determined by comparing the vehicle classification profile having the one or more features of the surrounding vehicle to historical data of previously observed surrounding vehicles.

2. The vehicle of claim 1, wherein the one or more features are provided in one or more distributions, and the probability that the surrounding vehicle will cut in front of the vehicle is determined at least in part by comparing the one or more distributions with one or more historical distributions.

3. The vehicle of claim 1, wherein the data of the surrounding vehicle comprises a speed profile including speed of the surrounding vehicle over a period of time.

4. The vehicle of claim 3, wherein the one or more features are extracted by performing a Fourier transform on the speed profile.

5. The vehicle of claim 1, wherein the data of the surrounding vehicle comprises a lateral movement profile including lateral movement of the surrounding vehicle over a period of time.

6. The vehicle of claim 5, wherein the one or more features are extracted by performing a Fourier transform on the lateral movement profile.

7. The vehicle of claim 1, wherein:
   the one or more sensors are further operable to generate vehicle data of the vehicle;
   the computer-executable instructions further cause the one or more processors to:
      receive the vehicle data; and
      extract one or more vehicle features from the vehicle data;
   the probability that the surrounding vehicle will cut in front the vehicle is based at least in part on the one or more vehicle features.

8. The vehicle of claim 7, wherein the probability that the surrounding vehicle will cut in front the vehicle is determined by:
   comparing the one or more features of the surrounding vehicle to historical data of prior surrounding vehicles; and
   comparing the one or more vehicle features of the vehicle to historical data of prior operation of the vehicle.

9. The vehicle of claim 8, wherein:
   the one or more features are provided in one or more distributions, and the probability that the surrounding vehicle will cut in front of the vehicle is determined at least in part by comparing the one or more distributions with one or more historical distributions; and
   the one or more vehicle features of the vehicle are provided in one or more vehicle distributions and the probability that the surrounding vehicle will cut in front of the vehicle is determined at least in part by comparing the one or more distributions with one or more historical vehicle distributions.

10. A method of controlling a vehicle, the method comprising:
    generating, by one or more sensors, data of a surrounding vehicle;
    extracting one or more features from the data of the surrounding vehicle;
    generating a vehicle classification profile of the surrounding vehicle;
    based on the one or more features of the vehicle classification profile, determining a probability that the surrounding vehicle will cut in front of the vehicle; and
    controlling the vehicle in accordance with the probability that the surrounding vehicle will cut in front of the vehicle,
    wherein the probability that the surrounding vehicle will cut in front of the vehicle is determined by comparing the one or more features of the surrounding vehicle of the vehicle classification profile to historical data of previously observed surrounding vehicles.

11. The method of claim 10, wherein the one or more features are provided in one or more distributions, and the probability that the surrounding vehicle will cut in front of the vehicle is determined at least in part by comparing the one or more distributions with one or more historical distributions.

12. The method of claim 10, wherein the data of the surrounding vehicle comprises a speed profile including speed of the surrounding vehicle over a period of time.

13. The method of claim 12, wherein the one or more features are extracted by performing a Fourier transform on the speed profile.

14. The method of claim 10, wherein the data of the surrounding vehicle comprises a lateral movement profile including lateral movement of the surrounding vehicle over a period of time.

15. The method of claim 14, wherein the one or more features are extracted by performing a Fourier transform on the lateral movement profile.

16. The method of claim 10, further comprising
    generating vehicle data of the vehicle; and
    extracting one or more vehicle features from the vehicle data, wherein the probability that the surrounding vehicle will cut in front of the vehicle is based at least in part on the one or more vehicle features.

17. The method of claim 16, the probability that the surrounding vehicle will cut in front of the vehicle is determined by:
    comparing the one or more features of the surrounding vehicle to historical data of prior surrounding vehicles; and
    comparing the one or more vehicle features of the vehicle to historical data of prior operation of the vehicle.

18. The method of claim 17, wherein:
    the one or more features are provided in one or more distributions, and the probability that the surrounding vehicle will cut in front of the vehicle is determined at least in part by comparing the one or more distributions with one or more historical distributions; and the one or more vehicle features of the vehicle are provided in one or more vehicle distributions and the probability that the surrounding vehicle will cut in front of the vehicle is determined at least in part by comparing the one or more distributions with one or more historical vehicle distributions.

19. The vehicle of claim 1, wherein the one or more vehicle features of the vehicle classification profile include a vehicle type, a vehicle make, a vehicle year, a vehicle color, or a vehicle condition.

20. The method of claim 10, wherein the one or more vehicle features of the vehicle classification profile include a vehicle type, a vehicle make, a vehicle year, a vehicle color, or a vehicle condition.

\* \* \* \* \*